Nov. 30, 1965     A. SMITH ETAL     3,220,486
CULTIVATOR TOOL

Filed June 8, 1964     3 Sheets-Sheet 1

INVENTOR.
ALEXANDER SMITH
B.D. BAGGS
By
Attorneys

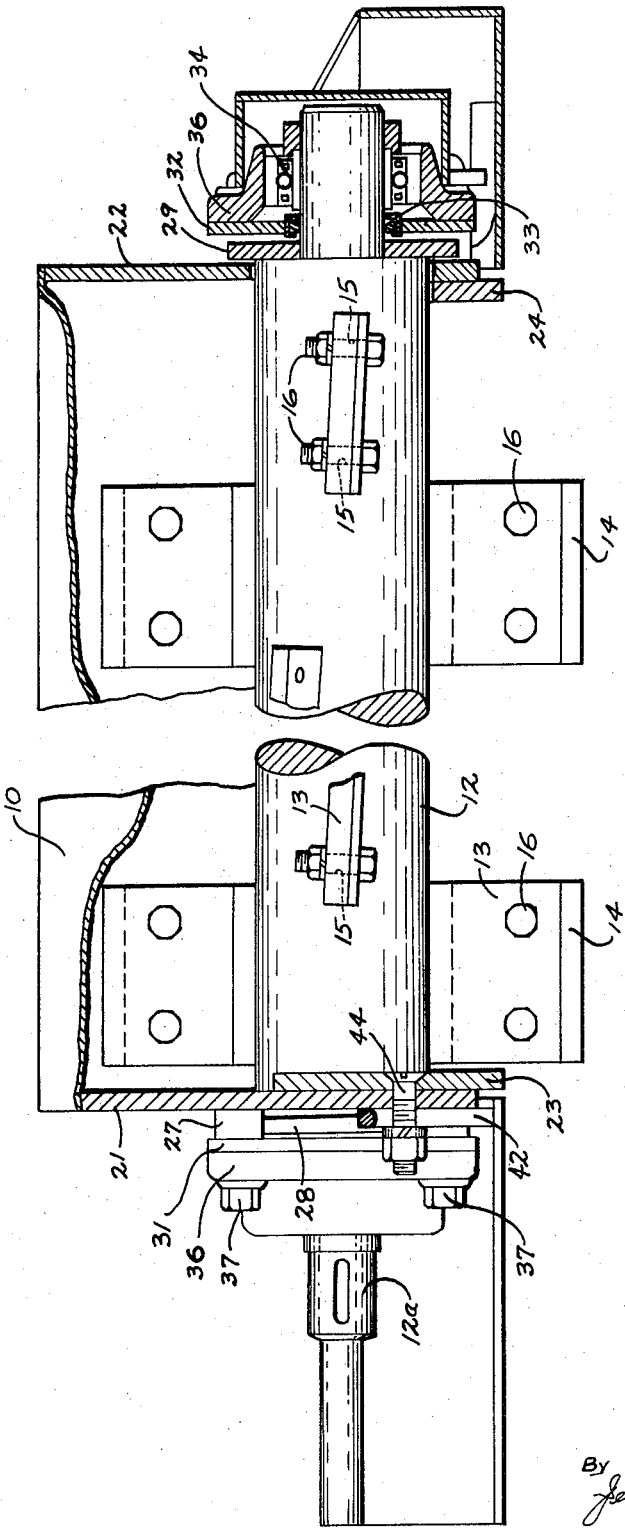

Nov. 30, 1965   A. SMITH ETAL   3,220,486
CULTIVATOR TOOL
Filed June 8, 1964   3 Sheets-Sheet 3
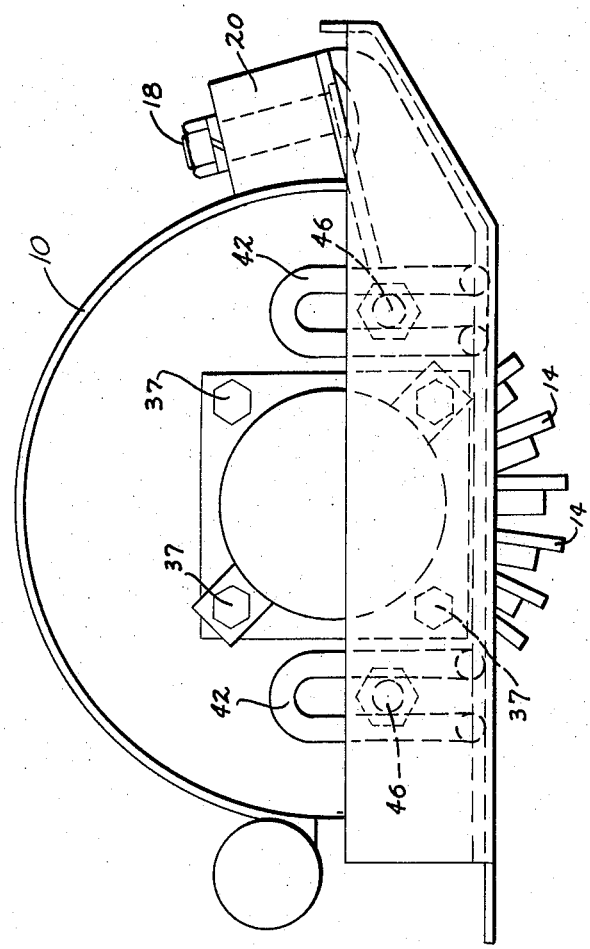
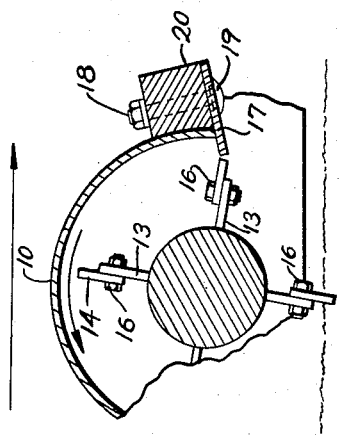
INVENTORS
ALEXANDER SMITH
B.D. BAGGS
By Jennings, Carter & Thompson
Attorneys United States Patent Office 3,220,486
Patented Nov. 30, 1965

3,220,486
CULTIVATOR TOOL
Alexander Smith and Burton D. Baggs, both of
P.O. Box 1736, Sanford, Fla.
Filed June 8, 1964, Ser. No. 373,407
4 Claims. (Cl. 172—119)

This application is a continuation-in-part of our previously filed application Serial No. 14,857, filed April 3, 1962, and is directed to details of construction, and improvements in, the weeder and cultivator tool therein described.

This invention relates to apparatus for weeding and cultivating, particularly to apparatus for weeding and cultivating around trees with low hanging branches, such as in orchards and in citrus groves. Such apparatus is usually referred to as under-tree cultivators. It will be apparent, however, that our improved apparatus is equally adaptable for weeding and cultivating generally.

One object of our invention is to provide a weeder and cultivator tool, adapted to being driven by a utility tractor, and which shall be effective to clear the ground of weeds and grass and to cut the weeds and grass into short lengths and mix the cut material with the earth, whereby to form a mulch, and at the same time, to work the soil to a safe depth.

Another object of our invention is to provide a weeder and cultivator tool including a rotary blade carrying element which shall have improved housing and mounting means whereby to provide longer wearing and a longer useful life.

Another object of our invention is to provide improved bearing means for the rotary element in our weeder and cultivator tool which shall include means for protecting the bearing elements against the ingress of grit and foreign material and thereby provide for longer useful life for the bearings than heretofore thought possible. A still further object of our invention is to provide an improved blade for a weeder and cultivator tool together with improved mounting means therefor whereby the blade shall have greater penetration into the soil with less friction than with blades heretofore employed with cultivators of the character described.

A more particular object of our invention is to provide a rotary blade carrying element with flat straight double edged blades which shall cooperate with an adjustable cutter bar to cut uprooted weeds and grass into short lengths, together with improved mounting means for the blades, whereby they may be reversed when one edge becomes worn.

As is well known in the art to which our invention relates, the cultivation of fruit and citrus trees has advanced from laborious, manually hoeing around the trees, to mechanically operated, power driven tools. In order to weed and cultivate trees with low hanging branches, power driven tools, relatively low in height, extending outwardly from the driving tractor, have been developed. For example, see our previously issued Patents Nos. 2,665,621, dated January 12, 1954, 2,777,272, dated January 15, 1959, and 2,976,663, dated March 28, 1961. Still another modification is described in our previously filed application, Serial No. 184,857, filed April 3, 1962, of which this is a companion application, and is directed to improved details of construction of the power operated weeder and cultivating tool therein described.

In the operation of under tree cultivators difficulties have been encountered in the way of rapid wear of the blade shaft bearings and in the ends of the housing in which the blade shaft and blades are mounted. Also, with blades heretofore known to us a great deal of difficulty has been encountered, especially where rank grass and weeds are present, by reason of weeds and grass wrapping around the shaft of the tool and choking it down. We have found that a flat blade presenting a straight edge to the ground, in cooperation with a cutter bar closely spaced with respect to the edges of the rotating blades, clears the blades and cuts the weeds and grass into short lengths and mixes them with the earth. In operation, the tool is rotated in a direction counter to the direction of rotation of the wheels of the driving tractor, so that the edge of each blade enters the ground at a forward moving angle which uproots the weeds and grass and carries them upwards against the cutter bar. The blades are reversible, whereby when one edge is worn, the blade may be reversed and thus double the useful life of the blade.

Apparatus embodying features of our invention is illustrated in the accompanying drawings, forming a part of this application, in which:

FIG. 2 is a side elevation, partly in section and with parts broken away and other parts omitted for the sake of clarity;

FIG. 3 is end view; and

FIG. 4 is detail sectional view, with parts omitted, showing the coaction between a blade and the cutter bar.

Figure 1:
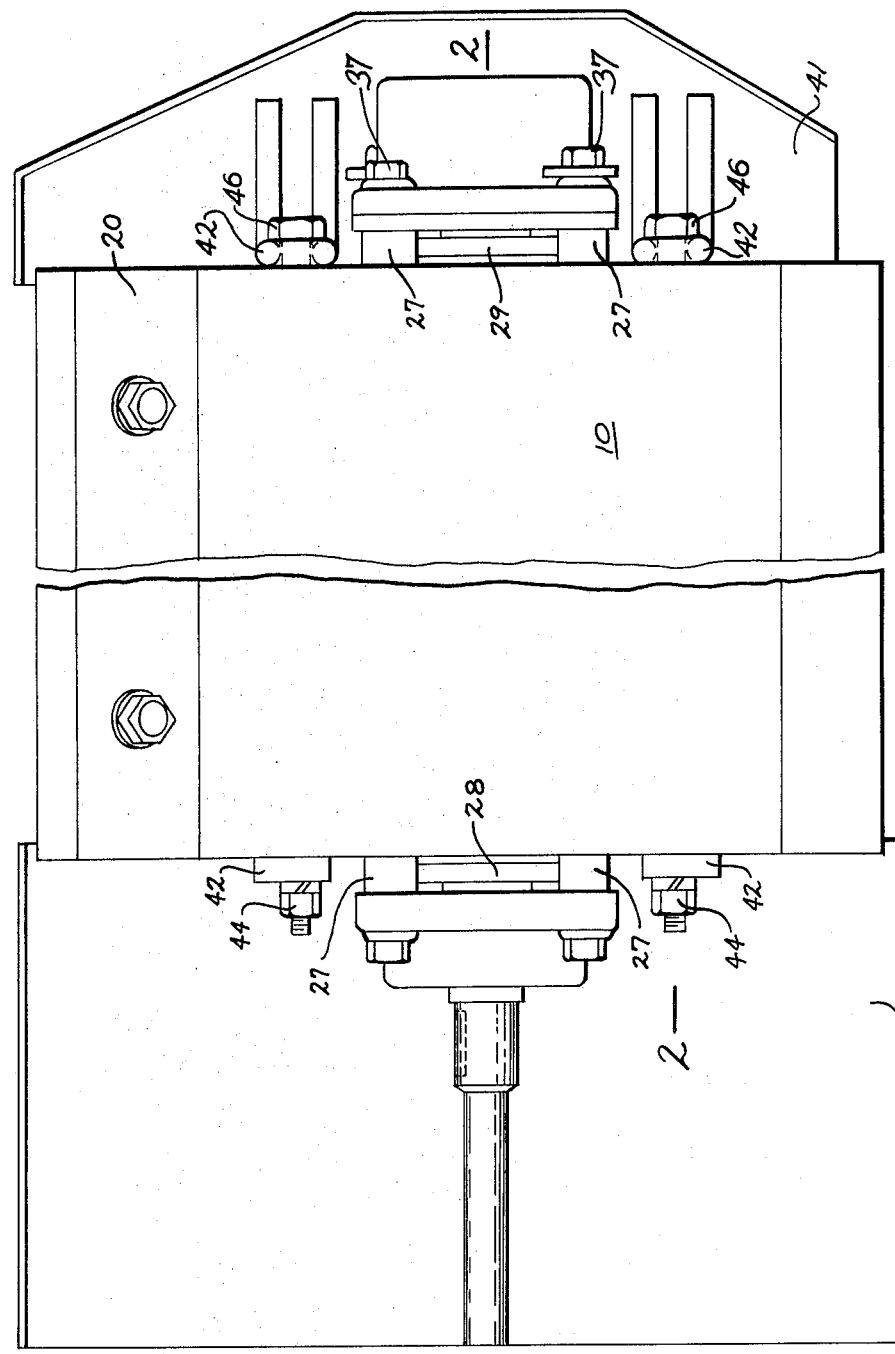
FIG. 1 is a plan view.

Referring now to the drawings for a better understanding of our invention, we show a main housing 10 which is generally semi-cylindrical in shape, with the open side facing downwards. In the housing is mounted a blade carrying shaft 12 which extends out of the ends of the housing 10 a sufficient distance to accommodate the drive connection and bearings to be described later. The shaft may be driven by any suitable source of power, which may be connected to the end 12a, as from the power take-off of a utility tractor such as is disclosed in our before mentioned patents. Mounted spirally around the shaft, in a plurality of diametrically opposed rows, are a plurality of blade holders, or lugs 13, each having a pair of bolt holes 15 therein. Mounted on each of the blade holders 13 is a flat blade 14 (only a few being shown) having a straight end portion presenting a horizontal edge to the ground as seen in FIG. 2. This design permits much shorter blades to be used and thereby reduces the overall height of the tool, making it more adaptable to work under low hanging branches.

The blades 14 are each held in place on the holders 13 by a pair of bolts 16, spaced midway between the ends of the blades and passing through bolt holes 15 in the holders. When one edge of a blade becomes worn it may be reversed on its holder, thereby providing a double life for the blade. The several blades are mounted with a slight overlap laterally relative to each other, so that, in rotation, they present a continuous hoeing surface to the ground.

As shown in FIG. 2 of the drawing, each blade extends only a short distance beyond the edge of its associated lug. Along the forward edge of the housing 10 is mounted a rectangular reinforcing bar 20 which supports a cutter, or shear, bar 17. The cutter bar is held in place by a plurality of bolts 18 passing through the rectangular bar 20 and through slotted holes 19 in the cutter bar 17, whereby it may be adjusted towards and from the edges of the blades 14. In practice we set the cutter bar at a distance of from 1/16 to 1/8 of an inch from the path of the edges of the blades. The edges of the blades are preferably set at an angle of approximately 5° to the long axis of the shaft 12 to provide a shearing action as the blades pass the cutter bar 17. We have found that it is not necessary for the edges of the blades to be sharpened. We preferably form them from strip steel 1/4" to 1/2" in thickness. By this means we secure longer life, better penetration into the soil, and many times less breakage than we have secured with the thinner, curved blades heretofore used.

A particular feature of our invention is the mounting of the shaft 12 in the housing in such away as to protect both its bearings and the housing from wear. The housing 10 is provided with end plates 21 and 22 which heretofore have been subjected to considerable wear, due to weeds mixed with sand and grit, being carried around by the adjacent blades 14. When the end plates become badly worn it has occasioned considerable labor and expense to replace them. To overcome this we have provided wear plates 23 and 24 which are located inside the housing, between the end plates 21 and 22 and the adjacent blades. The wear plates are each shaped to fit within the ends of the housing 10 and each is provided with a semicircular opening (not shown) to fit about the shaft 12. The wear plates are held in place in a manner to be described later. These may be readily replaced when worn.

On each of the end plates 21 and 22 are provided a plurality of spacing lugs, or bosses, 27. Secured on the shaft 12, at each end of the housing, and smaller in diameter than the space defined by the lugs 27, are what we term slinger rings 28 and 29. Adjacent each of the slinger rings, but held in spaced relation therefrom by the lugs 27, are bearing backing plates 31 and 32 through which the shaft 12 extends. Mounted in each of the backing plates 31 and 32, and snugly fitting about the shaft 12 is a grease seal 33.

On the shaft 12, adjacent each of the backing plates 31 and 32 is a bearing 34, including a bearing housing, or cover 36. The bearings 34, and the backing plates 31 and 32 are secured to the ends of the housing 10 by means of cap screws 37 which pass through the bearings and backing plates, and are screwed into tapped holes in the ends of the housing 10. The wear plates 23 and 24 are held in place by flat head bolts 44 and 46 which pass from inside the housing out through the wear plates 23 and 24 and end plates 21 and 22.

Secured to the ends of the housing 10 are skids 39 and 41 by the same bolts 44 and 46 that hold the wear plates in place. The skids determine the depth of penetration of the blades 14 into the earth. Each of the skids is provided with slotted brackets 42 through which the securing bolts 44 and 46 pass, and by means of which the positions of the skids may be adjusted.

From the foregoing description, the operation of our improved cultivating tool will be readily understood. As the tool is propelled over the ground the shaft 12 is rotated at an angular speed of from 400 to 600 r.p.m. in a direction counter to the direction of translatory movement of the tool over the ground, as indicated by the arrows in FIG. 4 of the drawing. As the shaft is rotated, some grass and weeds may wrap around the shaft 12 between the ends of the housing and the adjacent end blades, and some may be forced out through the end openings along the shaft. The slinger rings 28 and 29 turn these weeds and grass outwards and throw them off by centrifugal force, together with sand, grit and other abrasive material carried by them. They thus block the passing of the weeds and grass through the backing plates 31 and 32 into the bearings 34. We have found this to be a very important feature that serves to increase the useful life of the bearings many fold.

As the tool moves forward over the ground, the blades enter the ground with a forward angular movement similar to a manually operated hoe and uproot the grass and weeds in their path. The speed of rotation of the shaft 12 is such that it makes more than one complete rotation for every foot of forward movement of the tool over the ground. This insures that the entire surface of the ground is weeded and cultivated. The straight edges of the flat blades 14 permit the adjustment of the cutter bar 17 to a relatively close clearance with respect to the edges of the blades. By this means the uprooted grass and weeds are carried upwardly across the cutter bar and are cut into short lengths.

From the foregoing it will be apparent that we have devised an improved under tree cultivating tool which is simple of design and operation and which is effective to clear the ground of weeds and grass and at the same time, cultivate the ground to a safe depth.

While certain illustrative embodiments of our invention have been given in the foregoing, it is to be understood that other embodiments will be apparent therefrom and may be practiced within the scope of our invention, and that we do not intend to be limited except as indicated in the following patent claims.

What we claim is:

1. In a power driven cultivator including a rotary working tool and power means to propel the tool over the ground with its long axis normal to the direction of travel, (a) a main housing for the tool generally semicylindrical in shape with its open side downwards,
 (b) end plates on the housing each having a shaft opening therein,
 (c) wear plates fitting within the housing adjacent the end plates,
 (d) a horizontal blade shaft mounted in the housing and extending through the wear plates and the end plates outwardly of the housing,
 (e) means to rotate the blade shaft in a direction counter to the direction the tool is being propelled over the ground,
 (f) blade mounting lugs mounted on and arranged spirally along the shaft within the housing,
 (g) a plurality of flat, relatively heavy gauge, straight edged blades mounted on the lugs in laterally overlapped relation to each other with the edges of each blade at a slight angle to the long axis of the housing,
 (h) a slinger ring mounted on the shaft to rotate therewith outside the end plates and in spaced relation thereto at both ends of the housing,
 (i) a bearing on the shaft at each end of the housing outwardly of the slinger ring,
 (j) cap screws extending through the bearing, and into the end plates of the housing to secure the bearing to the housing,
 (k) ground engaging means at each end of the housing, and securing bolts passing from inside the housing through the wear plates and end plates to hold the ground engaging means in place.

2. A cultivator as defined in claim 1 in combination with an adjustable cutter bar mounted on the forward edge of the housing in closely spaced relation to the working edges of the blades.

3. A cultivator as defined in claim 1 in which means are provided to hold the slinger rings in spaced relation with the end plates on the housing and the bearings.

4. A cultivator as defined in claim 1 including bearing backing plates interposed between the slinger rings and the bearings and in spaced relation with the slinger rings, and a grease seal in each of the backing plates surrounding the shaft.

References Cited by the Examiner

UNITED STATES PATENTS

| | | | |
|---|---|---|---|
| 356,284 | 1/1887 | La Shells | 172—119 X |
| 774,249 | 11/1904 | Hinton | 172—547 X |
| 1,155,353 | 10/1915 | Haldeman. | |
| 1,402,858 | 1/1922 | Hamshaw | 172—554 |
| 2,397,782 | 4/1946 | Flynn | 172—119 X |
| 2,622,945 | 12/1952 | Nickle et al. | 308—36.4 X |
| 2,765,719 | 10/1956 | Day et al. | 172—39 X |
| 2,835,123 | 5/1958 | Galinski | 308—36.4 X |
| 2,870,850 | 1/1959 | Dethlefsen | 172—554 |
| 2,974,616 | 3/1961 | Pawela | 172—39 X |
| 3,092,053 | 6/1963 | Kirkpatrick | 172—119 |

ABRAHAM G. STONE, *Primary Examiner.*